United States Patent [19]

Mitch

[11] Patent Number: 4,677,290
[45] Date of Patent: Jun. 30, 1987

[54] METHOD OF ALIGNING AN OPTICAL FIBER WITH A LIGHT EMITTER VIA DIRECTING LIGHT TOWARD LIGHT EMITTER ACTING AS A DETECTOR

[75] Inventor: John H. Mitch, Tigard, Oreg.

[73] Assignee: Tektronix, Inc., Beaverton, Oreg.

[21] Appl. No.: 722,890

[22] Filed: Apr. 12, 1985

[51] Int. Cl.$^4$ .............................. G02B 6/36; G02B 7/26
[52] U.S. Cl. ................................... 250/227; 350/96.20
[58] Field of Search ................. 350/96.20, 96.22, 73.1, 350/96.15, 96.17; 250/551, 227

[56] References Cited

U.S. PATENT DOCUMENTS

| | | | |
|---|---|---|---|
| 3,809,908 | 5/1974 | Clanton | 350/96.20 |
| 4,090,793 | 5/1978 | Lebduska | 356/73.1 |
| 4,237,474 | 12/1980 | Ladany | 350/96.20 |
| 4,267,819 | 5/1981 | Claesson | 350/96.20 |
| 4,385,800 | 5/1983 | Basola et al. | 350/96.20 |
| 4,394,061 | 7/1983 | Schroeder | 356/73.1 |
| 4,475,789 | 10/1984 | Kahn | 350/96.15 |
| 4,479,698 | 10/1984 | Landis et al. | 350/96.17 |
| 4,500,165 | 2/1985 | Scholl et al. | 350/96.20 |

*Primary Examiner*—David C. Nelms
*Assistant Examiner*—William L. Oen
*Attorney, Agent, or Firm*—John Smith-Hill; Robert S. Hulse

[57] ABSTRACT

Alignment is established between a member that defines an optical path and a semiconductor device that, when electrically biased, emits light in a predetermined direction, so as to establish an optically coupled relationship between the member and the device, by passing light along the optical path in a direction towards the semiconductor device, so that light is incident on the semiconductor device. An electrical characteristic of the semiconductor device is observed, and relative movement between the member and the device is brought about until the electrical characteristic indicates a desired degree of optical coupling between the member and the device, and the device and the member are then mechanically coupled together.

11 Claims, 2 Drawing Figures

METHOD OF ALIGNING AN OPTICAL FIBER WITH A LIGHT EMITTER VIA DIRECTING LIGHT TOWARD LIGHT EMITTER ACTING AS A DETECTOR

This invention relates to a method of establishing alignment between a member that defines an optical path, such as an end region of an optical fiber, and a semiconductor device that, when electrically biased, emits light in a predetermined direction, such as a laser diode.

BACKGROUND OF THE INVENTION

As shown in FIG. 1, the conventional method of establishing alignment between an end region of an optical fiber 4 and a laser diode 6 entails establishing rough alignment, e.g. by visual inspection through a microscope, and then energizing the laser diode so that it emits light into the proximal end region of the fiber and observing the optical power output at the distal end 8 of the fiber, for example by means of a photodiode 10 connected to a power meter 12. The position and orientation of the proximal end region of the optical fiber relative to the light emitting region of the diode are adjusted until peak power is obtained, and the optical fiber is then secured relative to the laser diode. The two elements may be secured together by bonding both elements to a common support member. This method of establishing alignment between an optical fiber and a laser diode is subject to the disadvantage that the performance of laser diodes is highly temperature dependent. Therefore, the output power at the distal end of the optical fiber depends not only upon the position and orientation of the proximal end region of the fiber relative to the light emitting region of the diode but also upon the temperature of the diode. Energization of the laser diode results in dissipation of heat, affecting the temperature of the diode and therefore accurate alignment of the fiber relative to the diode is difficult. Moreover, the conventional method of securing the optical fiber relative to the diode involves soldering, and the elevation in temperature associated with the soldering so affects the performance of the diode that it is not possible to confirm, at the time of soldering, that the fiber and the diode are properly aligned.

SUMMARY OF THE INVENTION

In accordance with the present invention, alignment is established between a member that defines an optical path and a semiconductor device that, when electrically biased emits light in a predetermined direction, so as to establish an optically coupled relationship between the member and the device, by passing light along the optical path in a direction towards the semiconductor device, so that light is incident on the semiconductor device. An electrical characteristic of the semiconductor device is observed, and relative movement between the semiconductor device and the member that defines the optical path is brought about until the electrical characteristic indicates a desired degree of optical coupling between the member and the device, and the member and the device are then mechanically coupled together.

BRIEF DESCRIPTION OF THE DRAWINGS

For a better understanding of the invention, and to show how the same may be carried into effect, reference will now be made, by way of example, to the accompanying drawings in which.

In the different figures, like reference numerals denote like elements.

DETAILED DESCRIPTION

It has been discovered that when a laser diode is illuminated with light at the same general wavelength as it would emit in normal operation, it generates both a voltage and a current, and that this effect is less dependent on temperature than is normal operation of a laser diode.

Figure 1:
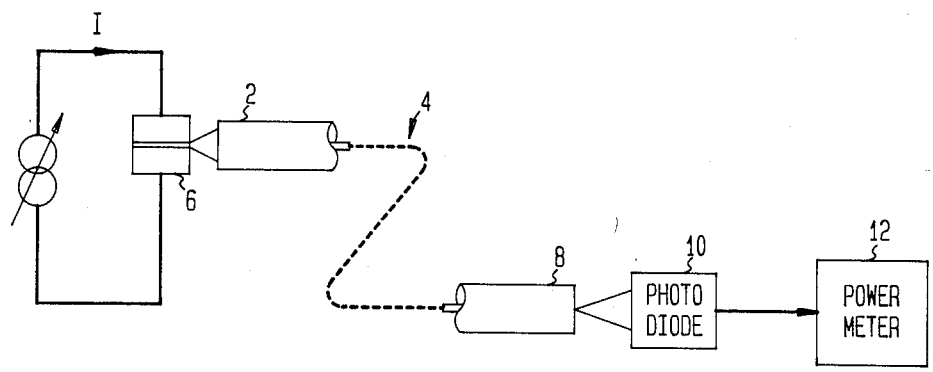
FIG. 1 illustrates schematically a conventional method for establishing alignment between an optical fiber and a laser diode.
Figure 2:
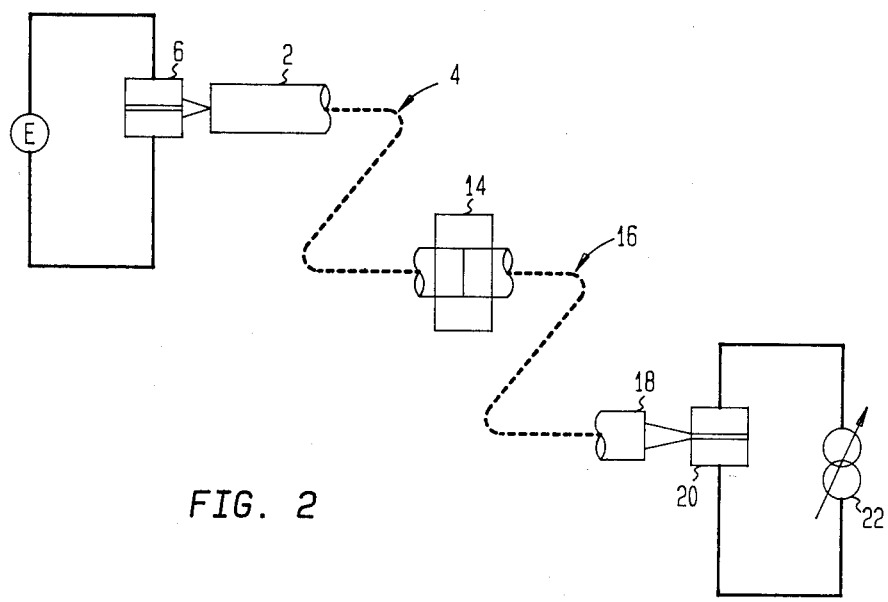
FIG. 2 illustrates schematically a method that embodies the present invention for establishing alignment between an optical fiber and a laser diode.

As shown in FIG. 2, an optical fiber 4 that is to have its end region 2 aligned with the light-emitting region of a laser diode 6 is temporarily spliced at 14 to a second fiber 16 that is illuminated at its end 18 that is farther from the splice 14 by a light source 20. The light source 20 may be a laser diode or a light-emitting diode (LED) and is biased by a variable current source 22 so as to emit light. The general wavelength of the light emitted by the source 20 is the same as that emitted by the laser diode 6 in normal operation. In a preferred method embodying the invention, the source 20 is essentially identical to the laser diode 6, i. e. they emit light at the same nominal wavelength when biased, and therefore the wavelength of the light emitted by the source 20 is the same, within normal specification tolerances (which may be up to about ±20 nm for laser diodes and up to about ±100 nm for LEDs), as the wavelength of the light emitted by the laser diode 6.

The end region 2 of the fiber is prepared in conventional manner, e. g. by cleaving and polishing, or microlensing, and is placed in the precision positioning stage (not shown) of a micromanipulator. The end region 2 is brought into rough alignment with the axis along which the laser diode 6 emits light, e. g. using visual inspection under a microscope. The laser diode is connected to a high input impedance voltmeter, e. g. an 11 megohm input impedance digital voltmeter, and the end region 2 of the fiber 4 is moved relative to the laser diode 6 using the micromanipulator, while observing the voltmeter for maximum voltage. The voltage developed by the laser diode 6 can be greater than one volt, but the slope of the curve of laser voltage output to light power input decreases as the power input increases. Therefore, it is preferable that the light power input should be decreased, by reducing the bias current to the light source 20, to maintain sensitivity as the optimum location for the fiber end region 2 is approached. When the desired position for the end region 2 is attained, the end region 2 is fixed in place relative to the laser diode 6, using conventional techniques such as soldering. It has been found that the voltage developed by the laser diode 6 declines by about 50% from ambient temperature to a typical soldering temperature. Nevertheless, the voltage indicated by the voltmeter during the fixing operation continues to provide a more accurate indication of optical coupling between the fiber 4 and the laser diode 6 than is obtained with the conventional method of establishing alignment. After the laser diode and the end region 2 have been fixed in place, the splice 14 is broken, and the assembly of the laser diode 6 and the fiber 4 is ready to be used in the desired application.

It will be appreciated that the invention is not restricted to the particular method that has been described with reference to FIG. 2 of the drawings, and that variations may be made therein without departing from the scope of the invention as defined in the appended claims, and equivalents thereof. For example, the described method has been used to establish alignment between a multimode optical fiber having a 62 μm core and multimode laser diodes having output wavelengths of 790 nm and 1300 nm, but the invention is also applicable to single mode fibers and lasers and to lasers that emit at other wavelengths.

I claim:

1. A method of establishing alignment between a member that defines an optical path and a semiconductor device that, when electrically biased, emits light in a predetermined direction, so as to establish an optically coupled relationship between said member and said device, comprising passing light along the optical path in a direction towards the semiconductor device, so that light is incident on the semiconductor device, observing an electrical characteristic of the semiconductor device, and bringing about relative movement between the member and the device until the electrical characteristic indicates a desired degree of optical coupling between the member and the device.

2. A method according to claim 1, further comprising mechanically coupling the member and the device.

3. A method according to claim 1, wherein the member that defines an optical path is an optical fiber having first and second ends, and the method comprises positioning a light source to introduce light into the optical fiber by way of the second end thereof and positioning the first end of the optical fiber relative to the semiconductor device to illuminate the semiconductor device with light introduced into the optical fiber by the light source.

4. A method according to claim 3, wherein the light source comprises a light emitting element and a second optical fiber, the second optical fiber having a first end that is mechanically and optically coupled with the light emitting element and also having a second end, and the step of positioning the light source relative to the second end of the first-mentioned optical fiber comprises splicing the second end of the first-mentioned optical fiber and the second end of the second optical fiber together.

5. A method according to claim 3, wherein the light source comprises a second semiconductor device that, when electrically biased, emits light, and the method comprises adjusting the electrical bias applied to the second semiconductor device to maintain the relationship between changes in the optical power emitted from the optical fiber by way of the first end thereof and changes in the electrical characteristic of the first-mentioned semiconductor device substantially constant as the degree of optical coupling between the optical fiber and said first-mentioned semiconductor device is varied.

6. A method according to claim 1, wherein the semiconductor device is a laser diode and the electrical characteristic that is observed is the voltage developed across the laser diode.

7. A method according to claim 1, wherein the semiconductor device is a laser diode and the electrical characteristic that is observed is the current generated by the laser diode.

8. A method according to claim 3, further comprising mechanically coupling the optical fiber and the semiconductor device by soldering.

9. A method according to claim 4, further comprising mechanically coupling the first-mentioned optical fiber and the semiconductor device, and subsequently detaching the second optical fiber from the first-mentioned optical fiber.

10. A method according to claim 9, wherein the first-mentioned optical fiber and the semiconductor device are mechanically coupled by soldering.

11. A method according to claim 3, wherein the semiconductor device is a laser diode and the electrical characteristic that is observed is the voltage developed across the laser diode, and the light source comprises a second semiconductor device that, when electrically biased, emits light, and the method comprises adjusting the electrical bias applied to the second semiconductor device to maintain voltage sensitivity of the laser diode to changes in optical power emitted from the optical fiber substantially constant as the degree of optical coupling between the optical fiber and the laser diode is varied.

* * * * *